Patented Dec. 26, 1944

2,365,889

UNITED STATES PATENT OFFICE 2,365,889

PROCESS OF TREATMENT OF SEWAGE

Scott E. Linsley, St. Paul, Minn.

Application February 14, 1941, Serial No. 378,852

6 Claims. (Cl. 210—2)

My invention relates to an improvement in the method of treatment of sewage, and relates more particularly to a process for the control of the efficiency and measurement of chemical dosage for sewage and sewage sludge.

In the purification of sewage and the dewatering of sewage sludges, quantities of chemicals are added to make possible the removal of the impurities by precipitation or to permit dewatering on vacuum filters or the like. The present invention relates to a process for treatment of the sludge or sewage to determine the proper quantities of these chemicals or the dosage necessary for maximum efficiency.

In the operation of a sewage disposal plant, the cost of the chemicals used is an extremely important factor in the economical operation of the plant. Because of the large quantities of chemicals used, and because of the high cost of these chemicals, a small percentage of saving of the chemicals used makes a considerable difference in the cost of operation. If the amounts of the chemicals used may be cut one-third or one-half, a tremendous saving in the cost of operation may be made unless, of course, other costs of operation increase in proportion.

In general, it may be said that the percentage of chemical dosage in most plants is much higher than is necessary. This is true for several reasons. As the percentage of chemical dosage is decreased, the frequency at which vacuum filters must be washed ordinarily increases, within the preferable range of operation. As a result, the attendants watching the operation must work harder when the dosage is cut. Furthermore, if insufficient chemicals are added to do the work, the efficiency of the chemicals drops sharply, the filters become blinded, and the entire system must be sometimes stopped to correct the fault, interrupting the continuity of the operation. For these and other reasons, a preponderance of chemicals are ordinarily used in order to insure their presence in sufficient quantity. Obviously, a much greater cost for chemicals is thus incurred than is necessary for most effective treatment of the sludge. The percentage of dosage was often based upon the amount of dry sewage solids in the sludge. In view of the widely variant range of minimums found by the dry solids method of computation, however, this method is unsatisfactory and inefficient.

I have found that the proper and most efficient dosage of the sewage and sewage sludge may be based on the percentage of volatile solids in the material. It has been found that the minimum dosage determined on a dry solids basis is variable, the minimum amount of chemical which may be effectively used increasing as the percentage of volatile solids therein increases. I have found, however, that the minimum percentage of chemical dosage, figured on a volatile solids basis, remains constant as the percent volatile matter increases. Thus, the minimum dosage can be readily determined by following my process and formula.

It is a feature of my invention that the most efficient range of operation of sewage treatment may be predicted in advance for various coagulants. The amount of chemical which should be used in the treatment may be determined by the following formula which I have developed:

$$C = \frac{V(\%D)}{100}$$

In the above formula, C equals the effective dry pounds of chemical added to a given sludge mixture; and this includes that already in the mixture if any is present. V equals the pounds of volatile solids in the sludge mixture. %D equals the percent dosage on a volatile solids basis.

If none of the above quantities were fixed, or could be considered a constant, the formula would be somewhat difficult to solve. I have found, however, that the value of the %D may be quite accurately determined. Thus, by merely finding the value of V in the sewage sludge to be treated, and following my process, the proper dosage may be provided.

I have found that, particularly in the case of some coagulants, there is little advantage in using a preponderance of the chemical. In the case of ferric chloride, for example, I have found that when the percentage of dosage is increased three or four per percent above the allowable minimum, no great advantage is gained; and at the same time this increased chemical cost greatly increase the cost of operation. I have also found, however, that once the minimum dosage is reached, a reduction in the dosage causes the effectiveness of the chemical used to drop sharply, thus making it desirable to maintain a dosage near or at the minimum, but not below this point.

Because of the fact that, with a decrease in dosage, the interval between filter washings also decreases, I have found that the point of minimum dosage is reached when the frequency of required filter washing starts to exceed the economical value, or saving in chemical. I have also found that this point virtually coincides with the point at which the effectiveness of the dosage drops sharply. I may thus arrive at the minimum dosage by what I term the filter basis of determination, as the minimum dosage as determined by this basis coincides substantially with the critical point in the reduction in dosage at which the effectiveness of the chemical drops sharply.

Because of the difference in method of operation in the various sewage disposal plants, different methods of determining the minimum dosage percentage may be used in different plants. As an example, the cost of filter cloths may be a minor consideration in certain plants, and important in others. The following method is therefore illustrative of one procedure which may be followed to arrive at the minimum dosage factor.

In the drawing forming a part of the specification:

Figure 1:
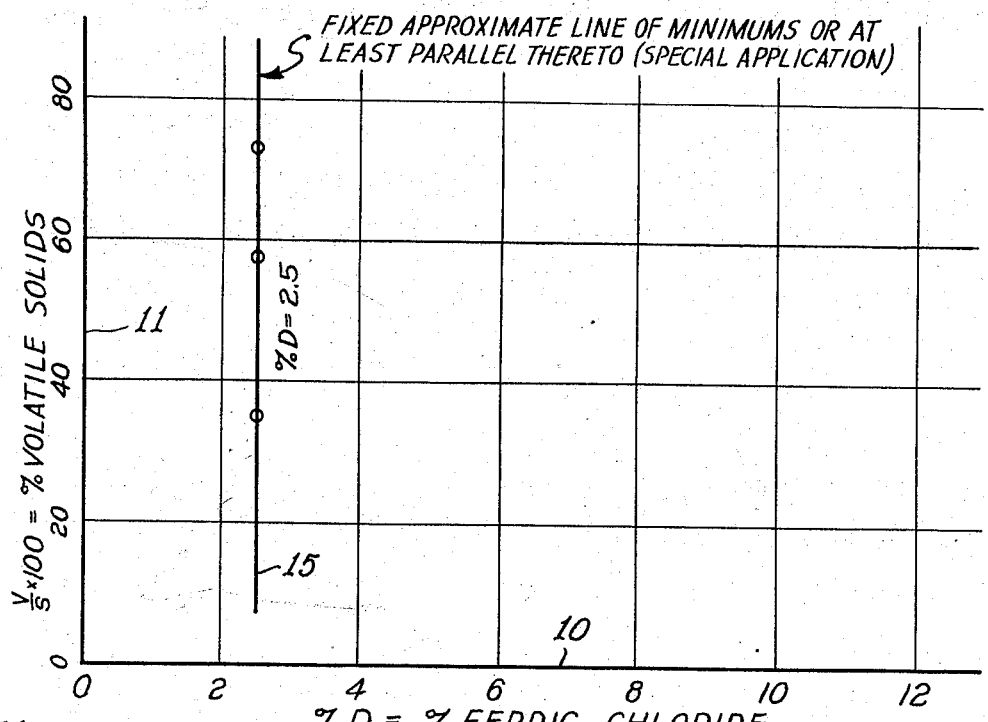
Figure 1 is a chart showing the percentage of dosage figured on a volatile solids basis.

In order to arrive at a basis for calculation, I may first arrive at the maximum cloth age for the filter cloths used. This may be determined from the "dump and wash" costs, or the cost of cleaning the filter cloths. The maximum cloth age is reached when the "dump and wash" cost equals and starts to exceed the installed cost of the cloth, including the cost of the cloth, wire, and labor. The frequency of the required filter washings then starts to exceed the economical value. This assumes, of course, that the chemical dosage is optimum or in excess, and that there is no question concerning adequate production. In other words we must assume that there is adequate filter capacity to handle the load. The limiting frequency of washing in hours will be defined below. As definitions of the terms used:

$N_p$ = Permissible number of washings. (Economical as to cloth, chemicals, wire, labor, and wash water.)

$N_n$ = Required number of washings regardless of $N_p$ in order to maintain production.

$N_t$ = Total number of washings during a cloth life H in hours.

H = Cloth life in hours.

It must be assumed that $N_p$ is equal to, or greater than, $N_n$ or the cloth cost would not be of any significance.

From the definitions, it will be recognized that:

$$N_p = \frac{\text{Cost of cloth}}{\text{Cost of wash plus waste}} = \frac{\text{Cloth} + \text{Wire} + \text{Labor}}{\text{FeCl}_3 + \text{CaO} + \text{Water}}$$

if the chemicals used are $FeCl_3$ and $CaO$. A study of the plant will show the maximum cloth age in hours, (for example 350 hours) and will show what the cost of the cloth, wire and labor will be on the average. Considering this cost to be $18.00 as a specific example, and considering the cost of the wasted chemicals and water to be about $.25, the equation may be read as follows:

$$N_p = \frac{\$18.}{\$.25} = 72, \text{ the permissible number of washings.}$$

$F_1$ = Limiting frequency of washing in hours between washes, but should not be governing until $N_p$ washes have occurred. (Production excluded.)

$$F_1 = \frac{H}{N_p} \quad \text{As limits,} \quad \frac{H}{N_p} = \frac{350}{72} = 5 \text{ hours.}$$

The minimum dosage-point is reached when for a small decrease in chemical feed, the wash and dump loss cost increase equals, or is slightly less than, the chemical feed cost decrease, and any further reduction in chemical feed would result in a wash and dump loss cost increase greater than the chemical feed cost decrease, for the same volume of sludge handled.

The above statements apply when facilities for production are adequate and the filter cloths are not blinded. Questions pertaining to increased investment costs appear to be minor in the face of present high chemical feed costs compared to the need and costs of facilities to provide adequate production, such as when the filter capacity is sufficient to handle the load. In order to determine the minimum dosage a rapid way of finding the limiting frequency of washing in hours between washes will be shown below:

As definitions of the terms used:

$D_{li}$ = Wash and dump loss increase in cost per hour.

$D_{ln}$ = Wash and dump loss normal cost per hour.

$D_{lt}$ = Wash and dump loss total cost per hour.

$F_p$ = Present or existing instantaneous chemical feed cost per hour.

$F_t$ = New chemical feed cost per hour.

$F_w$ = Limiting frequency of washing in hours between washings.

$$F_w = \frac{24}{N_{day}} - \frac{1}{N_h}$$

$G_d$ = Decrease in gallons of chemical ($FeCl_3$) fed per hour.

H = Normal cloth life in hours (350).

$F_d$ = Decrease in chemical feed cost per hour.

$N_{day}$ = Total number of washes per day.

$N_h$ = Number of washes per hour, or $$\frac{N_{day}}{24}$$

$N_t$ = Total number of washes in cloth life (72).

With the above definitions in mind, we find that when the wash and dump loss increase in cost per hour equals, or is slightly less than, the decrease in chemical feed cost per hour, this is the point at which minimum dosage is reached.

$$D_{li} = F_d$$

Obviously, from the above definitions:

$$D_{li} = D_{lt} - D_{ln}$$

The wash and dump loss normal cost per hour is equal to the total number of washes in the cloth life, which we have set at 72, divided by the total number of hours in the life of a cloth, which we have set at 350 hours, times the cost of wash plus waste, which we have set at $.25.

$$D_{ln} = \frac{N_t}{H} \times .25$$

The wash and dump loss total cost per hour equals the total number of dumps per day, divided by 24, times the cost of wash plus waste. In other words:

$$D_{lt} = \frac{N_{day}}{24} \times .25$$

$$D_{li} = .25\left(\frac{N_{day}}{24} - \frac{N_t}{H}\right)$$

$$= .25(N_h - \tfrac{1}{5})$$

The decrease in chemical feed cost per hour is equal to the present or existing chemical feed cost per hour less the new feed cost per hour:

$$F_d = F_p - F_n$$

The decrease in chemical feed cost, when $FeCl_3$ and $CaO$ are used, for example, is equal to the decrease in gallons of $FeCl_3$ per hour times the cost per gallon of $FeCl_3$ plus the decrease in pounds of $CaO$ per hour used times the cost of $CaO$ per pound. Considering as an example that FeCl₃ costs $.12 cents per gallon, and that CaO costs $8.13 per ton, we find:

$$F_d = .12G_d - \text{pounds per hour CaO decrease} \times \frac{\$8.13}{2000}$$

Disregarding, or fixing the cost of one of the variables, for the purpose of arriving at a result for one chemical:

$$F_d = .12G_d - \text{neglect or fix the cost of the lime.}$$

From the first formula, $D_h = F_d$, we can then assume:

$$.25\left(N_h - \frac{N_t}{H}\right) = .12G_d$$

$$.25(N_h - .2) = .12G_d$$

$$N_h - .2 = \frac{.12G_d}{.25}$$

$$N_h = \frac{.12G_d}{.25} + .2$$

$$Fw = \frac{1}{N_h} \frac{1}{.48G_d + .2}$$

Cloth life is usually determined by capacity considerations. The cost of the cloth may or may not be important relative to other costs. Once the limiting frequency of washing in hours between washings has been determined, by the equations it is possible to determine the change in the rate of feed of the chemical in order to operate at the desired minimum.

It must be borne in mind that this illustrates merely one way of determining the point of minimum dosage. While from the foregoing description the method appears difficult and complicated, it should be remembered that every disposal plant has figures and data from which the information can be obtained. It should further be considered that, in obtaining a minimum dosage curve, only a few points are necessary in plotting the curve to check results.

I have now found the minimum amount of chemical to be added for most efficient results. From this figure, it is possible to determine the %D in the formula $$\%D = (C \div V)\,100$$

where %D equals the percent dosage on a volatile solids basis; C equals the dry pounds of chemical added to a given sludge mixture, plus that already in the mixture if any is present; and V equals the pounds of volatile solids in the pounds of dry sewage solids in the above given sludge mixture.

In order to determine the %D in the above formula, it is only necessary to substitute as C the dry pounds of chemical added to the given sludge mixture determined as described above and to test sewage samples to determine the quantity of V. When this has been done it will be found that the percent dosage on a volatile solids basis varies under different conditions substantially as follows:

For activated sludge using FeCl₃ alone:
2.0% to 15.0%
For digested sludge using FeCl₃ alone:
2.0% to 3.3%
For raw sludge using FeCl₃ alone:
2.0% to 15.0%
Raw sludge using FeCl₃ and CaO:
FeCl₃—2.0% to 3.3%
CaO—5.0% to 12.0%
Raw chemically precipitated sludge using FeCl₃ and CaO:
FeCl₃—2.0% to 3.3%
CaO—5.0% to 12.0%

While FeCl₃ has been given as an example, other iron containing compounds, such as ferric sulphate, may be used. An equivalent amount of iron should be used to that shown in the above table, the percentage of the dose depending upon the relative amount of iron in the particular iron compound used.

The drawings illustrate the manner in which %D remains fixed. When this %D is figured on a volatile solids basis the percent D or the percent dosage of FeCl₃ on a volatile solids basis is plotted on the horizontal line 10, while the percentage of volatile solids in the material is plotted on the vertical line 11. When %D is figured for a plurality of specific cases, it will be found that this %D remains substantially constant. In other words, when the proper amount of chemical is added %D remains constant regardless of the amount of volatile solids. For this reason %D can be considered a constant in my formula $$C = \frac{\%D \times V}{100}$$

once the proper amount of %D has been determined.

Figure 2:
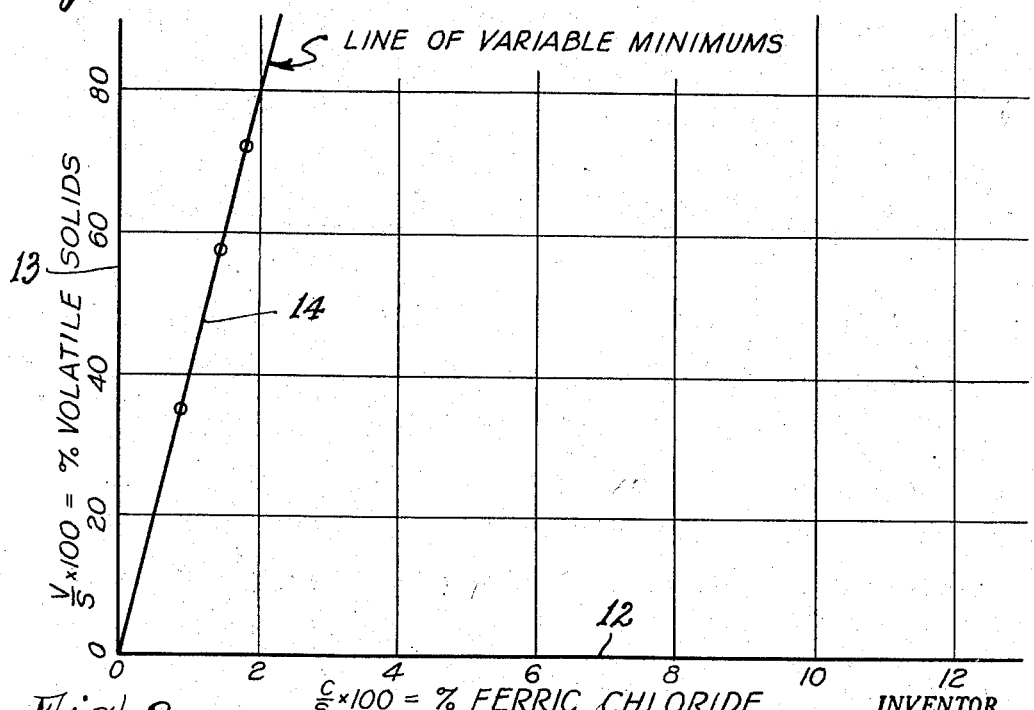
Figure 2 is a chart showing the percent dosage figured on a dry solids basis.

Figure 2 illustrates the variable line of minimums when the dosage is figured on a dry solids basis. In this figure the percent FeCl₃ on a dry solids basis or the $$\frac{(C \times 100)}{S}$$

is plotted on the horizontal line 12, while the percentage of volatile solids or $$\frac{V \times 100}{S}$$

is plotted on the vertical line 13. Under various conditions of operation the percentage of FeCl₃ on a dry solids basis is determined and it will be found that this percentage increases as the percentage of volatile solids increases to produce an inclined line 14, rather than the substantially vertical line 15 found in Figure 1. S in the above formulas equals the pounds of dry sewage solids. Thus, it will be seen that the percentage of dosage on a dry solids basis is variable with changes in the percentage of volatile solids so that this dosage percentage can not be used as a fixed minimum.

In order that my method be completely understood the system of treatment of the sewage will now be described in detail. The sewage is first screened by coarse screens and then by finer screens. The velocity of the sludge flow of the sewage is then preferably decreased to take out the sand contained in the sewage. From this point two methods may be followed. The sewage may be conducted through settling tanks which have a variable time detention. The sludge settles out in these settling tanks. The sludge is then preferably conducted into concentration tanks and allowed to stand in these tanks for a predetermined period of time, such as 24 hours. In one form of my process the supernatant liquor is drawn off and introduced back into the intake or into the mixing chamber.

In the bottom of the concentration tanks there are collectors which withdraw the sludge. The sludge is passed from the bottom of the collector to a bucket elevator sump. Bucket elevators elevate the sludge to conditioning tanks where chemical solutions are added and mechanical air agitation occurs. The sludge then flows out of the conditioning tanks to the vacuum filter basins where an agitator keeps the material mixed until it is removed by the vacuum filter. The separation of the sludge cake and a filtrate occurs by virtue of the filters.

As an alternative method, after the sand has been removed coagulants might be added and the mixture run through a mixing chamber in which violent agitation occurs. The sludge may then pass through flocculating mixing chambers where gentle agitation takes place.

The amount of chemical which should be used is determined on the basis of the needed degree of treatment, or percentage of total solids removed. This figure varies in different plants, and is, in some instances, indirectly regulated by laws which determine the condition of the plant effluent. This figure may be found from hourly plant data recordings, substituting in my formula for C and V when plant samples indicate that the desired degree of removal is reached, to obtain the value of %D.

Using this figure as a constant and by determining the volatile solids in the sludge mixture we can solve for C in the formula $$C = \frac{V\%D}{100}$$

In order to determine the quantity of V, however, samples of the sludge are taken and 10 g. of a representative sludge sample is weighed as rapidly as possible into an ignited and tared evaporating dish. The sample is evaporated to dryness (requiring about 60 to 75 minutes). The sample is then placed in an oven at 103° C. for 30 minutes. It is then cooled in a desiccator and reweighed. The results are then reported as percent total dry solids (or percent moisture).

To determine the volatile solids (or ash) including volatile inorganic salts, the residue from the determination of percent dry solids is ignited in an electric muffle at 600° C. (dull red heat), for 15 minutes. It is then cooled in a dessicator and reweighed. The results are then reported as percent volatile solids (or percent ash).

The results on dry solids, volatile solids and fixed solids as determined above are subject to considerable error because of losses of volatile compounds during evaporation, such as ammonium carbonate, carbon dioxide, and volatile minerals during ignition, and due to the presence of calcium oxide in the ash. In the interpretation of results these possible errors must be recognized.

After the pounds of volatile solids in the pounds of dry sewage solids in a given sludge mixture has been found in the above manner, the pounds of dry chemicals to be added thereto to provide a minimum dosage may be obtained from my formula by solving for C.

$$C = \frac{V(\%D)}{100}$$

For the purpose of safety, the %D is maintained at slightly above the absolute minimum. I have found that the British thermal unit content of the dry solids of the sludge have a bearing on the results, and the minimum dosage for any sludge mixture could be determined even within narrower limits if some factor of the British thermal unit content were figured in the result. In the absence of any quick method of determining the British thermal unit content, however, I have not utilized this factor, as the limits between which my minimums may err are small. If the British thermal unit content were computed, the %D on the volatile solids British thermal unit content method of computation would be:

$$\%D = (C \div V \times B) 100$$

where B=British thermal units per pound of volatile solids.

In conclusion, I wish to point out that I have found that the effective dry pounds of chemical in a given sludge mixture, divided by the pounds of dry sewage solids, $$\frac{(100)C}{S}$$

increases with an increase in volatile solids therein, $$\frac{V(100)}{S}$$

making it difficult to set a fixed minimum percentage of chemical to be used by the dry solids basis of computation. I have found, however, that the percentage of dosage on a volatile solids basis, %D of $$\frac{C(100)}{V}$$

remains substantially constant on an increase in the volatile solids $$\frac{V(100)}{S}$$

therein. Therefore, a fixed minimum figure for %D can be used in th determination of the proper amount of chemical to add to the sludge to provide the most economical dosage under every condition and for every coagulant. Below this fixed minimum percentage, the effectiveness of the chemical will decrease rapidly and above this figure the cost of the chemicals used will be greater than necessary.

In the foregoing discussion, I have described my method as particularly relating to ferric chloride and lime, but I wish it understood that various coagulants can be used. The price of the coagulant has a bearing on the balance between the limiting frequency of washings and the chemical costs. In other words, the ratio between the decrease in cost of chemical feed and the wash and dump loss cost increase will vary with the cost of various chemicals. Coagulants which have been used in addition to those mentioned are chlorinated copperas, aluminum sulphate, or alum, sulphuric acid, sulphur dioxide, ferric salts, ferric sulphate, and others.

In accordance with the patent statutes, I have described the principles of my method, and while I have endeavored to set forth the best embodiments thereof, I desire to have it understood that obvious changes may be made within the scope of the following claims without departing from the spirit of my invention.

I claim:

1. The method of treating sewage sludge comprising treating the sludge with a metallic salt selected from the class consisting of ferric chloride, chlorinated copperas, aluminum sulphate, alum, and ferric sulphate, and filtering the treated sludge, the amount of metallic salt added to the sludge being determined by first obtaining a sample of the sludge, weighing said sludge sample and evaporating the same to dryness, igniting the residue and reweighing to determine the percent of volatile solids therein, using this value of the weight of volatile sewage solids in the sample in the formula:

$$\%D = (C \div V)\,100$$

wherein percent D is the percent dosage on a volatile solids basis, C equals the dry weight of metallic salt added to the sludge sample, and V equals the weight of volatile solids in the weight of dry sewage solids in the sludge sample, the weights being expressed in the same units, determining the value of $\%D$ by the above formula, and using this $\%D$ as a constant, determining the amount of metallic salt to be added to any sludge mixture by solving for C in the equation:

$$C = \frac{\%D \times V}{100}$$

in which $\%D$ is the constant determined as previously stated, V equals the weight of volatile solids in the weight of dry sewage in the sludge to be treated, and C equals the dry weight of metallic salt added to the sludge mixture treated.

2. The method of treating a known amount of sewage sludge consisting in adding to the sludge a metallic salt selected from the class consisting of ferric chloride, chlorinated copperas, aluminum sulphate, alum, and ferric sulphate, and filtering the treated sludge, the amount of metallic salt used in the treatment being determined by taking a sample of the sludge, determining the volatile solids content of the sample, and solving for $\%D$ in the formula:

$$\%D = (C \div V)\,100$$

wherein $\%D$ is the percent dosage on a volatile solids basis, C equals the effective dry weight of metallic salt in the sample required to provide optimum filtering conditions, and V equals the weight of volatile solids in the sample; and using this $\%D$ as a constant to determine the amount of coagulant added in the above mentioned formula by solving for C in the equation:

$$C = \frac{\%D \times V}{100}$$

where $\%D$ is the constant determined as above, V equals the weight of volatile solids in the sludge to be treated, and C equals the amount of metallic salt to be added to properly treat the sludge to be treated. all of said weights being expressed in similar units.

3. The method of treating a known amount of sewage sludge, consisting in adding to the sludge a metallic salt selected from the class consisting of ferric chloride, chlorinated copperas, aluminum sulphate, alum, and ferric sulphate, and filtering the sludge mixture, the amount of metallic salt to be added being determined by first computing by test the least amount of the selected metallic salt which may be used in the sludge without having the cost of changing the filters increase above the saving in cost of the selected metallic salt, taking a sample of the sludge, determining the volatile solids therein, computing the percent of dosage on a volatile solids basis through the formula:

$$\%D = (C \div V)\,100$$

where C equals the dry pounds of metallic salt added to the sludge sample to provide the optimum conditions as computed above, V equals the pounds of volatile solids in the sludge sample, and $\%D$ equals the percent dosage on a volatile solids basis; and using this $\%D$ as a constant in the formula:

$$C = \frac{\%D \times V}{100}$$

to determine the amount of chemical to be used in any given sludge mixture, C in the last formula equalling the weight of chemical to be added to the known amount of sludge, and V equals the weight of the volatile solids in the weight of sludge to be treated, all of said weights being expressed in similar units.

4. The method of treating a known amount of sludge, the method consisting of treating the sludge with ferric chloride, and filtering the sludge, the amount of ferric chloride used being determined from the formula:

$$C = \frac{\%D \times V}{100}$$

where C equals the effective dry weight of chemical which must be present in the mixture, V equals the weight of volatile solids in the sludge, and $\%D$ is a value between 2 and 3.3, all of said weights being expressed in similar units.

5. The method of treating sludge comprising mixing the sludge with a metallic salt selected from the class consisting of ferric chloride, chlorinated copperas, aluminum sulphate, alum, and ferric sulphate, and filtering the sludge mixture, the amount of metallic salt used in the treatment being determined by taking a sample of the sludge mixture, determining the volatile solids content therein, determining the British thermal unit content thereof and using the values found in the formula:

$$C = \frac{\%D \times V \times B}{100}$$

where C equals the dry weight of metallic salt added to the sample, V equals the weight of volatile solids in the sludge mixture, $\%D$ equals a constant, and B equals the British thermal unit per pound of volatile solids, all of said weights being expressed in similar units, the value to be used as $\%D$ being determined by solving the above formula for $\%D$ when tests prove the weight of C used to be optimum.

6. The method of treating sludge consisting of adding ferric chloride and lime to the sludge, and filtering the treated sludge, the method consisting of taking a sample of the sludge, determining the amount of volatile solids therein, and adding to the sludge an amount of ferric chloride and lime separately determined by the formula:

$$C = \frac{\%D \times V}{100}$$

where C equals the dry weight of ferric chloride and of lime to be added to the mixture, V equals the weight of volatile solids in the sludge to be treated, and $\%D$ is a value between 2 and 3.3 for ferric chloride, and between 5 and 12 for lime.

SCOTT E. LINSLEY.